(12) United States Patent
Trump et al.

(10) Patent No.: US 7,916,299 B2
(45) Date of Patent: Mar. 29, 2011

(54) METHOD AND APPARATUS FOR OPTICAL DETECTION OF A PHASE TRANSITION

(75) Inventors: Martin Trump, Pforzheim (DE); Oliver Burk, Unterreichenbach (DE)

(73) Assignee: Stratec Biomedical Systems AG (DE)

( * ) Notice: Subject to any disclaimer, the term of this patent is extended or adjusted under 35 U.S.C. 154(b) by 519 days.

(21) Appl. No.: 12/017,256

(22) Filed: Jan. 21, 2008

(65) Prior Publication Data

US 2008/0192255 A1    Aug. 14, 2008

(30) Foreign Application Priority Data

Jan. 20, 2007   (DE) .................. 10 2007 003 040

(51) Int. Cl.
*G01N 21/00* (2006.01)
(52) U.S. Cl. ......................................... 356/440; 356/436
(58) Field of Classification Search .......... 356/432–444, 356/128–137; 250/339.12, 339.07, 339.11, 250/341.2; 73/293
See application file for complete search history.

(56) References Cited

U.S. PATENT DOCUMENTS

| | | | | |
|---|---|---|---|---|
| 4,427,293 A | * | 1/1984 | Harmer | 356/133 |
| 4,440,022 A | * | 4/1984 | Masom | 73/293 |
| 4,711,126 A | * | 12/1987 | Houpt et al. | 73/293 |
| 4,893,935 A | * | 1/1990 | Mandel et al. | 356/436 |
| 5,055,699 A | * | 10/1991 | Konig et al. | 250/577 |
| 5,094,819 A | * | 3/1992 | Yager et al. | 422/82.07 |
| 5,196,898 A | * | 3/1993 | Tamura et al. | 356/70 |
| 5,362,971 A | | 11/1994 | McMahon et al. | |
| 5,418,615 A | * | 5/1995 | Doyle | 356/436 |
| 5,436,454 A | * | 7/1995 | Bornstein et al. | 250/339.12 |
| 5,530,553 A | * | 6/1996 | Hsia et al. | 356/436 |
| 6,975,403 B2 | * | 12/2005 | Navarro Herrero et al. | 356/435 |

FOREIGN PATENT DOCUMENTS

| | | |
|---|---|---|
| DE | 200 09 083 | 8/2000 |
| DE | 696 23 879 | 5/2003 |
| DE | 699 14 604 | 9/2004 |
| EP | 0 619 476 | 10/1994 |
| GB | 2 221 986 | 2/1990 |

* cited by examiner

*Primary Examiner* — Sang Nguyen
(74) *Attorney, Agent, or Firm* — Cantor Colburn LLP

(57) ABSTRACT

The device and the method are used for optical detection of at least one phase transition between at least two media, which are taken into a line and/or dispensed from the line by an intake and/or dispensing device. A light-emitting transmitter emits light across and onto the line at a measurement point provided for this purpose. A receiver receives the emitted light, which is influenced by media in the line, to form reception signals. At least one waveguide, which is arranged up to the measurement point on the probe, is provided between the transmitter and/or the receiver and the measurement point (M). Due to the fact that the waveguide is arranged in parallel to the line at least in the area near the probe and at least one deflection lens is provided in the area of the measurement point to deflect the light emitted and/or the light to be detected, a phase boundary or state can be detected, and the dead volume is reduced.

31 Claims, 10 Drawing Sheets

METHOD AND APPARATUS FOR OPTICAL DETECTION OF A PHASE TRANSITION

REFERENCE TO RELATED PATENT APPLICATIONS

The present patent application claims the priority of German Patent Application 10 2007 003 040.3 filed on Jan. 20, 2007, the content of which is herein incorporated by reference in its entirety.

FIELD OF THE INVENTION

The present invention relates to a device and a method for the optical detection of a phase transition between at least two media or a static state of media.

BRIEF DESCRIPTION OF RELATED ART

Such detection of a phase transition and/or a static state is necessary, e.g., in metering operations with liquids, which are often a part of mixing or analytical methods in which accurate doses of liquids are taken from liquid quantities and mixed together, for example. Such operations are routinely performed in chemical, pharmaceutical, medical and human biological procedures, but they may also occur in other technical fields. If the incorrect doses of liquids are not detected, they may lead to results that are objectionable or even dangerous for the health of living creatures, in particular humans, if we consider only the use of such dosing operations in the pharmaceutical field. On the other hand, unnecessary rejects in dosing should be avoided and dead volumes should be reduced as much as possible so as not to unnecessarily waste valuable substances, which under some circumstances may be available only in limited supply.

Essentially, the transfer of defined volumes of liquid in the instruments used in clinical analysis begins with an intake process in which the liquid to be transferred is drawn into a disposable pipette, for example. This intake may be disturbed by various circumstances, e.g., air bubbles in the container or inhomogeneities in the liquid caused by coagulates, technical defects in the system such as leakages, etc. All these circumstances lead to a deviation between the actual intake volume and the ideal intake volume. Such circumstances are also manifested at the phase transition(s) between the liquid medium taken up and the gas in the pipette.

DE 200 09 083 U1 discloses a capacitive measurement in combination with an optical measurement of phase transitions between liquids in a sample container. In this method, two sensors (steel needle and fiber optics) are immersed in the liquid, and this device may also be used for a pipetting operation. The fiber optics emit light in the immersion direction and use the light reflected at the phase boundary for the measurement. The phase boundary is detected below the intake opening of the pipetting needle. Instead of integrating the fiber optics into the pipetting needle, both of the waveguides are inserted into the liquid to be pipetted side-by-side in parallel. The fiber optics thus come in direct contact with the media and must then be decontaminated.

DE 696 23 879 T2 and DE 699 14 604 T2 have already disclosed the importance of detection of phase transitions and/or the interface between different media. DE 696 23 879 T2 therefore proposes emitting light onto a tube, which is light-permeable and carries a medium, at a measurement point, and measuring the reflected and/or scattered light to deduce from this whether a phase transition or an interface has passed by the measurement point. The components required for this, such as infrared photodiode, photodetector and apertures, are used directly at a measurement point in a housing. On the basis of the corresponding dimensions, the sensor must therefore be placed at a distance from the pipetting tip. A detection angle of 90° is used for measurement of the scattered and/or reflected light components. Air here offers a high useful signal while liquid offers a diminished useful signal. The turbidity of the liquid thus has no effect on the sensor result. On the basis of the sensor design in the housing, the measurement point cannot be placed close to the pipetting tip. Therefore, complex calibration procedures are necessary to implement a verification of a liquid. At the same time, this leads to a considerable dead volume between the measurement point and the pipetting tip. One disadvantage of this placement is that the liquid volume to be pipetted must pass through this entire distance in order to be considered as having been correctly drawn in. However, along this distance, the formation of droplets, a breakaway of the air gap, dilution effects with the system liquid, etc. may occur.

These falsify the verification result or even the reagents to be pipetted. Based on the large dead volume, a "calibration lane" is necessary to compensate for greater tolerances accordingly.

EP 0 619 476 B1 discloses an optical detector system for determining the liquid level in a transparent container such as a capillary tube, with which pipetting can also be performed. The geometric position (height) of the liquid in the tube is determined here. Technically, this is accomplished with an illumination lens (homogeneous illumination over the entire height of the tube) and detection optics with a CCD camera (row). The illumination and detection may take place at different angles to one another. The structure for optical determination is relatively large, so that it cannot be integrated into a pipetting needle. Furthermore, the capillary tube must be outwardly open to be able to evaluate the filling level with the lens, but this can lead to soiling. The use of a capillary tube and filling level analysis in an area prevents the evaluation of large volumes from being evaluable.

U.S. Pat. No. 5,362,971 A discloses a fiber optic sensor that is immersed with the fiber area "to be measured" in the liquid "to be measured." To do this, a loop of a waveguide is exchanged immersed in a liquid. Small volumes therefore cannot be differentiated merely on the basis of the dimensions. This is thus a level measuring device for liquids in containers. Furthermore, the fiber optics come in direct contact with the media.

GB 2 221 986 A also discloses a fiber optic sensor which is immersed with the fiber area "to be measured" in the liquid "to be measured" to determine the optical density of the medium using the transmitted light method. To do this, light is introduced by waveguides into an area in a biochemical reactor that is detected again by a second waveguide. In the transmitted light method, the classical design of a photometer is implemented for measurement of the optical density of a medium. On the basis of the curvature of one of the fibers required for the transmitted light method, the sensor head must be designed with large dimensions. No "deflecting lens" is used to achieve "miniaturization." Therefore, the sensor to be immersed can be immersed only in large volumes of liquid. This sensor along with the measurement area is also immersed completely in the medium to be tested.

BRIEF SUMMARY OF THE INVENTION

Against the background of this prior art, the invention allows more accurate detection of the phase boundary while reducing the dead volume.

The invention provides a device and a method for optical detection of at least one phase transition between at least two media and/or one static state of media.

This device and method comprise the pairing of a conventional intake and/or dispensing device, e.g., a needle made of steel or other materials, optionally nonconducting materials, with a line integrated into it, preferably being transparent for at least one certain radiation, having a fiber optic sensor comprising at least one wave guide. The measurement point of the fiber optic sensor here is placed as close as possible to the intake/delivery opening of the steel needle to minimize the dead volume between the intake/delivery opening and the measurement point. The intake volume is preferably much greater than the dead volume between the measurement point and the intake opening. From the signals detected by the fiber optic sensor, which are in turn influenced by the medium in the line and/or the associated change in the refractive indices, an analyzer unit is able to detect the phase transition between different media on the basis of the received signals that are converted into electric signals, e.g., a phase transition from liquid to air or vice versa. It is likewise possible to detect whether a liquid or gaseous medium, for example, is present in the line, i.e., the static state of media. Due to the fact that the measurement point passes through at least one waveguide that is parallel to the line and a respective deflecting lens as far as possible to the probe and/or to the tip of the pipetting needle, it is possible to recognize much more rapidly than in the state of the art whether the intake and/or dispensing operation has been successful. Furthermore, this compact design can be integrated as needed into the hollow needle of the pipetting device. In particular by means of this design it is possible to test liquids flowing past the measurement point to detect disturbances to thereby at least qualitatively monitor the correct uptake/dispensing of liquids indirectly and thus verify it. If quantitative detection is necessary, the dimensions of the pipetting needle must also be known, and the time between successive phase boundaries can be detected so that the volume flow can be determined.

Typical detectable errors include, for example:
clogged intake opening (clots)
poor/no intake (defect in pump, leaking system)
intake opening not submerged at the time of intake
mix-up of the intake opening in the intake process
intake of foamy liquids.

Integration of the measurement point into the pipetting tip has positive effects on pipetting quality and efficiency, e.g.,
no dilution effects due to very short intake paths,
shorter contaminated tube distance and therefore short washing times associated with this,
faster pipetting due to minimized intake paths of the liquids.

The use of different wavelengths for input or detection can be adapted to the media to be pipetted in order to optimize the signal quality. The light of the waveguides is preferably reflected via conical deflecting surfaces and/or mirror surfaces, preferably of the hollow needle, to integrate the measurement point M as closely as possible at the tip of a pipetting needle.

Optical detection alone is also efficient, e.g., instead of a capacitive liquid level detection. Because of the short distance between the measurement point and the intake opening, the device "sees" when liquid is drawn in and can use this for surface detection. It is thus possible to omit a conductive tip and/or conductive system. Nonconductive liquids may also be detected reliably.

A capacitive liquid level detection may also be used in parallel as needed. To do this, the hollow needle is conductive and is accommodated in a housing of the device where it is electrically insulated with respect to the equipment ground. The two sensors together constitute a redundant sensor system, which can be verified mutually in function during operation. Thus, a system is created which can check itself functionally on the basis of the two present methods, which are completely different physically.

Additional advantages are derived from the additional claims and the following description.

BRIEF DESCRIPTION OF THE FIGURES

The present invention is explained in greater detail below on the basis of an exemplary embodiment, which is depicted in the figures, in which.

DETAILED DESCRIPTION OF PREFERRED EXEMPLARY EMBODIMENTS

The present invention will now be explained in greater detail by way of example, with reference to the accompanying drawings. However, the exemplary embodiments pertain only to examples, and are not intended to limit the inventive concept to a certain arrangement.

Before describing the invention in detail, it should be pointed out that it is not limited to the respective components of the device and the respective method steps because these components and methods can vary. The terms used here are intended only to describe special embodiments and are not used restrictively. Furthermore, if the singular or the indefinite article is used in the description or the claims, this may be understood to also refer to a plurality of these elements as long as the overall context does not unambiguously specify the contrary.

Figure 1:
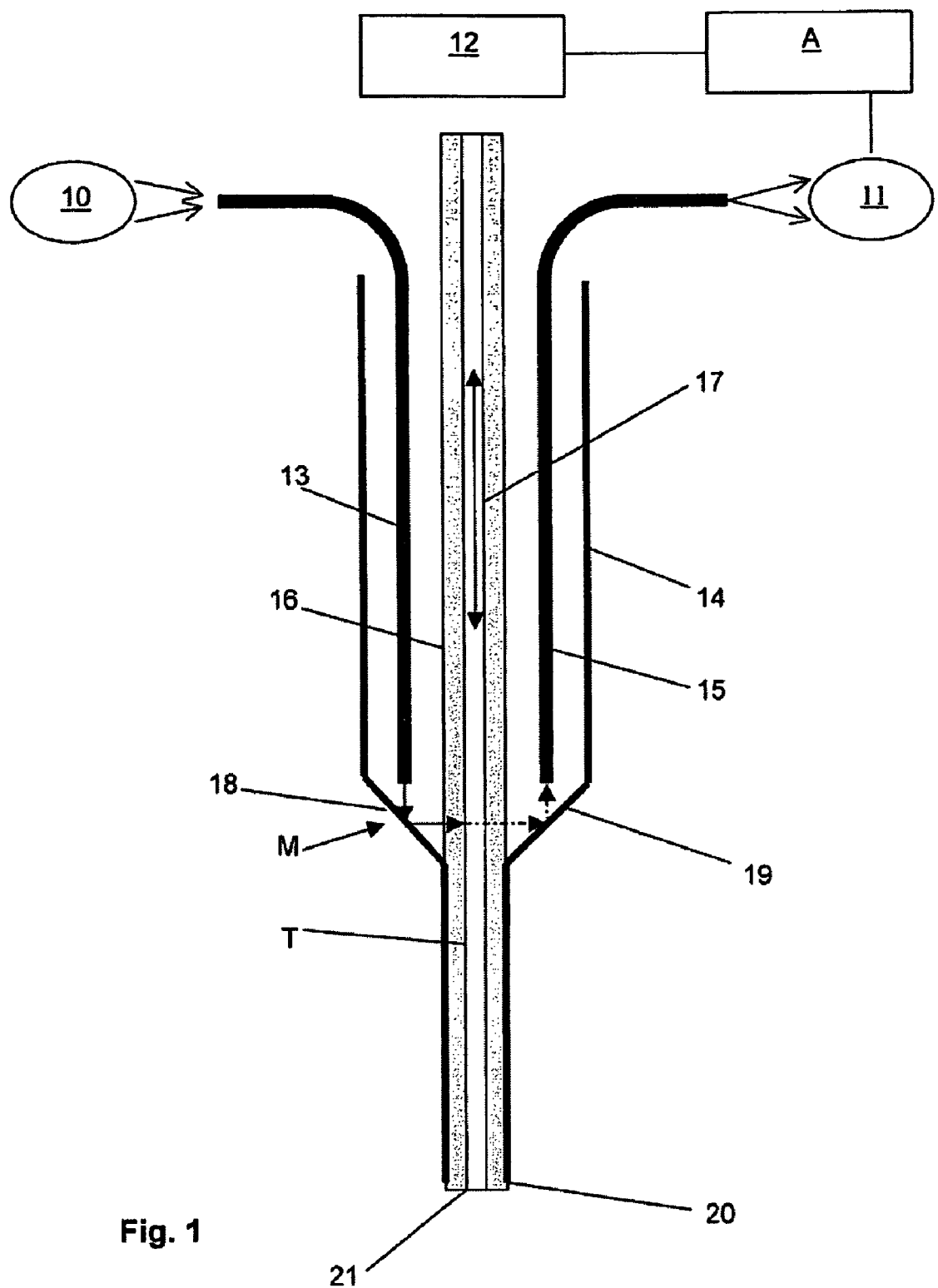
FIG. 1 shows a schematic view of an intake device and/or a dispensing device for a pipetting system.

FIG. 1 shows schematically a device for optical detection of at least one phase transition between at least two media and/or a static state of media, which are drawn into a line 16 and/or dispensed from the line by an intake and/or dispensing device. The term "a static state of media" is understood to refer to the test of whether there is a liquid or gaseous medium at the measurement point in the line.

Such a device is used for dosing a preferably liquid medium in a vessel, such as a probe 20, which is at least partially filled with a gas, preferably air. The dosing process is in particular an aspiration and/or dispensation process such as that used on a pipetting system. Such dosing devices are used for dosing preferably liquid media in chemical, pharmaceutical, medical and human biological methods and the like. It is important inasmuch as the quantities to be dosed must be determined accurately, and in particular it is necessary to detect if the dosing operation has failed, regardless of the reason.

With the device according to FIG. 1, the phase transition between a liquid medium and a gaseous medium is detected to thereby make an inference regarding the quality of the intake or delivery process. The device has a pump 12 for intake and/or dispensing at least one of the media into and/or out of the line 16 in the direction of the arrow 17. A probe 20 is arranged like the tip of a pipette, for example, on the end of the line 16. Light is emitted by at least one light-emitting transmission element 10 across and onto the line 16 at a measurement point M that is provided for this purpose. To receive the light emitted by the transmission element 10 and influenced by the media in the line 16, at least one receiving element 11 is provided to form reception signals. An analyzer unit A analyzes the reception signals for detection of the phase transition. At least one waveguide 13, 15 is provided between the transmission element 10 and/or the receiving element 11 and the measurement point M, continuing up to the measurement point on the probe 20 and preferably arranged along the length of the hollow needle 14 in parallel to the line 16, at least in the area near the probe 20, and preferably integrated into the hollow needle 14. The measurement point of the fiber optic sensor is placed as close as possible to the intake/dispensing opening 21 of the steel needle to minimize the dead volume between the intake/dispensing opening and the measurement point. The intake volume is preferably significantly greater than the dead volume between the measurement point M and the intake opening 21. The ratio between the dead volume and the intake volume is usually between 1:5 and 1:10.

Thus by means of fiber optic elements, such as at least one waveguide 13, 15, light from a light source, the transmission element 10, is directed into the area of the probe 20 and/or the tip of the pipetting needle, which is formed by a hollow needle 14 in the exemplary embodiment. The light emitted at the end of the transmitting wave guide 13 is deflected by 90° on a deflecting lens in the form of a conically shaped inside surface of the steel pipe as a deflecting surface 18 in the exemplary embodiment, so that the light strikes the line 16 at an angle of 90°. As an alternative, any other deflection lens may also be used. The line 16 is preferably a tube that is transparent or translucent for a certain wavelength of light at least in the area of the measurement point. The light striking the line 16 is reflected, diffracted and/or absorbed differently, depending on the content of the line as a result of the associated change in the refractive indices. Depending on the local position of the receiving waveguide 15, this yields differences in signal response which can be utilized to evaluate the medium in the interior of the tube.

Figure 2:
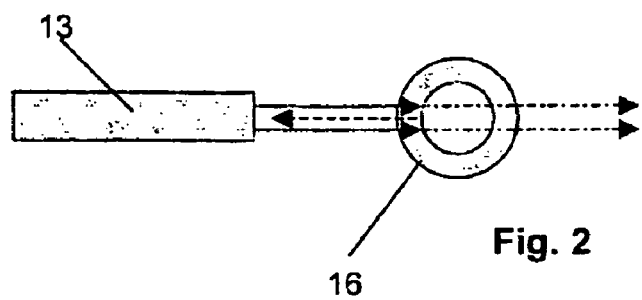
FIG. 2 shows a schematic diagram of an arrangement in which the transmitting waveguide is identical to the receiving waveguide.

Preferably at least two waveguides 13, 15 lead to the measurement point M for transmitting and/or receiving the light; if necessary, however, only one waveguide may be provided as in the exemplary embodiment of FIG. 2. The line 16 is accommodated by a preferably metallic hollow needle 14, at the end of which the measurement point M is provided.

In the area of the measurement point M, an optical aperture 22 may be provided close to the end of the at least one waveguide 13, 15. The waveguides are oriented on this optical aperture, which is made of black or nontransparent plastic, for example. The aperture serves to prevent direct crosstalk of the waveguides and to limit the path of the light in the detection area at the measurement point. The optical aperture thus ensures that the useful signal is input only through light from the desired detection angular range into the receiving waveguide 15. The geometric shape of the optical aperture 22 defines the detection angular range. At most, all interfering light components can be separated from the useful signal through the aperture. The height and/or vertical extent of the measurement point $V_h$ is defined essentially by the height of the conical area of the hollow needle 14. In the exemplary embodiment, this height is $\leq 1$ mm. The sensor resolution (smallest volume resolution) with a tube inside diameter of $D_i = 0.6$ mm is thus defined as follows:

$$V_{min} = \pi/4 * D_i^2 * V_h = 0.28 \ \mu l.$$

A larger value must be assumed on the basis of signal hysteresis, mechanical tolerances and detection rate.

It is currently assumed that volume disturbances $>1$ μl can be detected reliably.

The recording and analysis of the sensor signal take place during the pumping operation. This is thus a preferably continuous recording, e.g., in a fixed time frame. The sensor is operated as an air/liquid discriminator. It detects whether air or liquid is in the sensitive area at the measurement point M at any given point in time. Since changes in the media in the line 16 can be detected reliably and the phase transitions are also clearly discernible, with preferably continuous sampling at the measurement point M, and with a known diameter and known intake rate, the volume flow and thus the intake volume can be measured, e.g., from the operating parameters of the pump 12, e.g., the piston speed.[1] The volume flow can also be determined by an additional sensor. The measured volumes can be compared directly with the ideal values for the volume.

[1] Translator's Note: omitted from the translation: "die" in "die z.B. aus den Betriebsparametern der Pumpe 12 . . . messen." p. 11

The actual volume can also be determined from the phase transitions alone if, in addition, the points in time of the phase transitions are detected. The number and points of time of the transitions are compared with expected values because it is known whether air or liquid intake is intended.

The light passing through the transmitting waveguide 13 into the area of the measurement point M can be deflected there via at least one deflecting surface 18, 19 and directed at the line 16. The same is also true of the light to be detected. The at least one deflecting surface 18, 19 is preferably formed by conically shaped interior surfaces of the hollow needle 14, which is preferably designed as a steel tube, which at the same time contributes toward a space-saving design. A suitable other deflecting lens may be used likewise or in addition. The height of the measurement point M in the longitudinal direction of the line 16 is determined essentially by the height of the conical area of the hollow needle in this embodiment.

The waveguide 13 assigned to the transmission element 10 is preferably arranged at an angle to a waveguide 15 assigned to the receiving element 11 in a side view through the line 16.

According to FIGS. 2 through 7b, various detection angles are possible based on the incident beam of light in relation to the line 16 so that, for a better overview, deflection on the conical inside surface and/or deflecting surface 18, 19 and on additional apertures such as the optical aperture 20 is not shown.

In an arrangement according to FIG. 2, there is an angle of 0° between the position of the waveguide 13 from which light is emitted onto the line 16, and the waveguide 15 assigned to the receiving element 11, i.e., the transmitting waveguide and the receiving waveguide are one and the same waveguide 13. With this, a reflection measurement (transmission waveguide=reception waveguide) is performed. Light is deflected from the transmitting waveguide 13 onto the line 16. Most of the light is transmitted or absorbed. A portion of the light is reflected to varying extents on the interface in the interior of the line 16, depending on the medium in the line. This reflected light is picked up by the waveguide 13, which in this case is at the same time the receiving waveguide, and is sent to the receiver 11. This approach requires only one waveguide, so this allows a smaller installation space. The signal (air/gas < > liquid) is independent of the turbidity of the liquid. However, the useful signal must be output from the transmitted light signal, which is possible through appropriate cycling. Reflections at the interfaces of the waveguides can have an interfering effect here. Since only a small amount of light is reflected, a highly amplifying measurement technique may be necessary.

Figure 3:
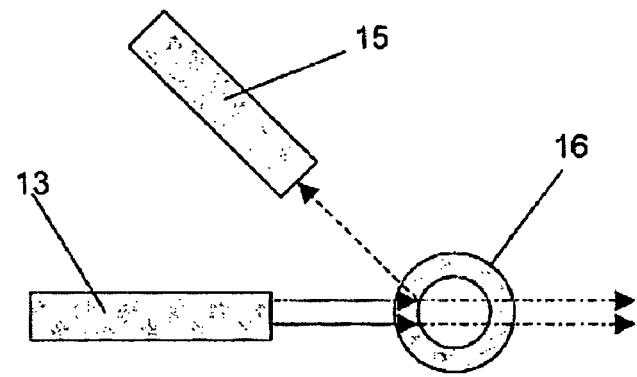
FIGS. 3, 4 show a schematic diagram of an arrangement in which the transmitting waveguide is arranged at an acute angle or a right angle to the receiving waveguide.

FIG. 3 shows an approach with a 45° reflection measurement, in which another acute angle between the transmitting waveguide 13 and the receiving waveguide 15 leads to comparable results. Light is directed from the transmitting waveguide 13 onto the line 16. Most of the light is transmitted or absorbed. A portion of the light is reflected to different extents at the interface in the interior of the line as a function of the medium in the line 16. This reflected light is absorbed by the receiving waveguide 15, which in this case is arranged at an angle of approx. 45° to the transmitting waveguide, and the light is sent to the receiver. The signal (air/gas < > liquid) is independent of turbidity in the liquid. The useful signal is clearly separated optically by the second receiving waveguide 15, but two waveguides are needed. Since only a small quantity of light is reflected, a highly amplifying measurement technique may be necessary.

Figure 4:
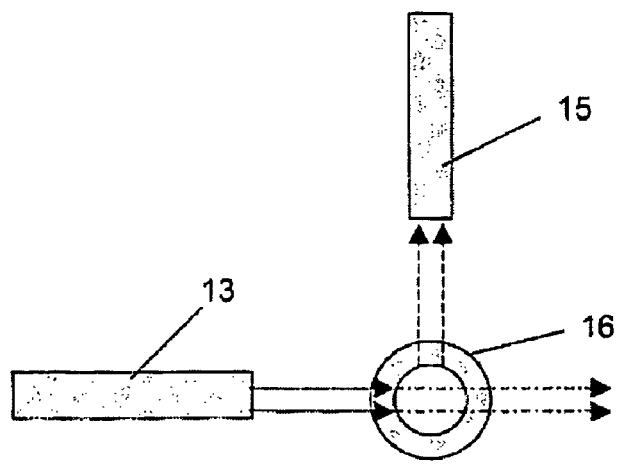

FIG. 4 shows a scattered light measurement at a 90° arrangement of transmitting waveguide 13 and receiving waveguide 15. Light is directed from the transmitting waveguide 13 onto the line 16. Most of the light is scattered to different extents in the interior of the tube and by the tubing material as a function of the medium in the tube. This scattered light is absorbed by the receiving waveguide 15, which in this case is arranged at an angle of approx. 90° to the transmitting waveguide 13, and is sent to the receiver 11. The signal (air/gas < > liquid) is independent of turbidity in the liquid, and the useful signal is clearly separated optically by the second receiving waveguide 15, but two waveguides are again necessary. Since only a small quantity of light is reflected or scattered, a highly amplifying measurement technique may be necessary.

Figure 5A:
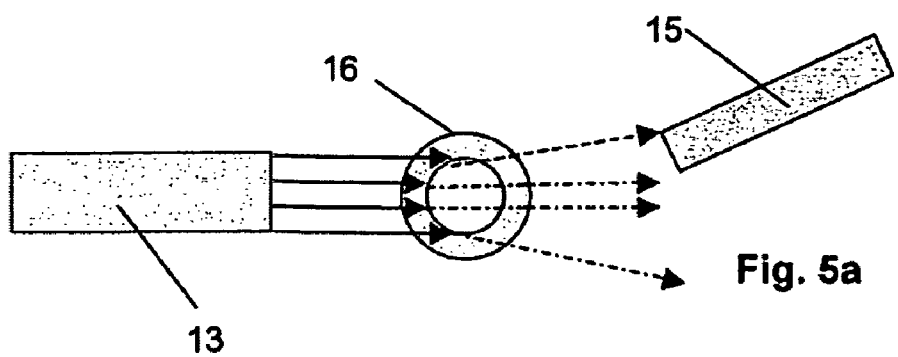
FIGS. 5a, 5b shows a schematic diagram of an arrangement in which the transmitting waveguide is arranged at an obtuse angle in relation to the receiving waveguide, shown both with and without medium in the line.
Figure 5B:
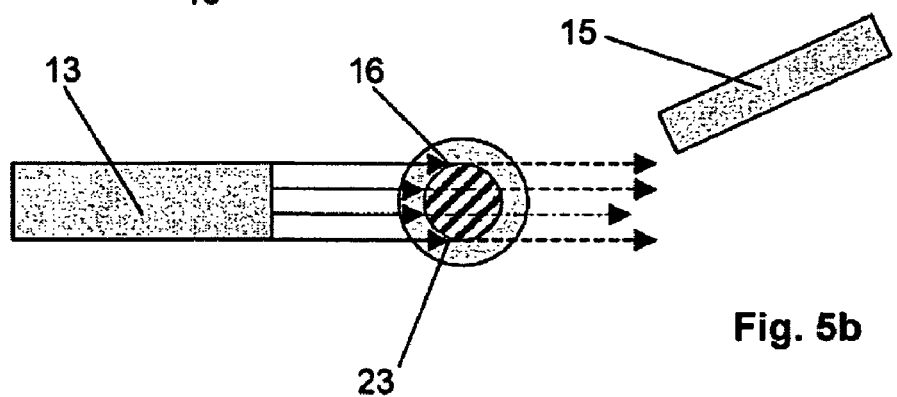

FIGS. 5a, 5b show an arrangement with an obtuse angle of preferably 120° to 175° and in particular from 155° to 175° between the transmitting waveguide 13 and the receiving waveguide 15. The transmission measurement which is thus performed supplies a high signal value according to FIG. 5a in the presence of gas and/or air in the line 16, and supplies a lower signal value in the presence of a liquid medium 23 according to FIG. 5b. Light is directed from the transmitting waveguide 13 onto the line 16. Most of the light is transmitted or absorbed. A portion (only boundary zones) of the light is reflected on filling with gas and/or air (total reflection at the boundary layer). When filled with a liquid medium (water, which has approximately the same refractive index as the tubing material), the portion that is otherwise totally reflected is transmitted without interference and therefore is no longer detected. In this case, the receiving waveguide 15 is placed in such a way that the totally reflected light is detected. The exact angular position here depends on the inside diameter of the line 16. The received signal (air/gas < > liquid) is independent of turbidity in the liquid medium 23 because the gas and/or the air always represents the higher signal value. Due to the use of the two waveguides, the useful signal is clearly separated optically. Here again, two waveguides are required. However, diffraction and scattering effects of the liquid medium may have an interfering effect. The precision in placement of the waveguides may be problematical because it depends on the geometry of the tubing. Since only a small quantity of usable light is available, highly amplifying electronics may be required.

Figure 6A:
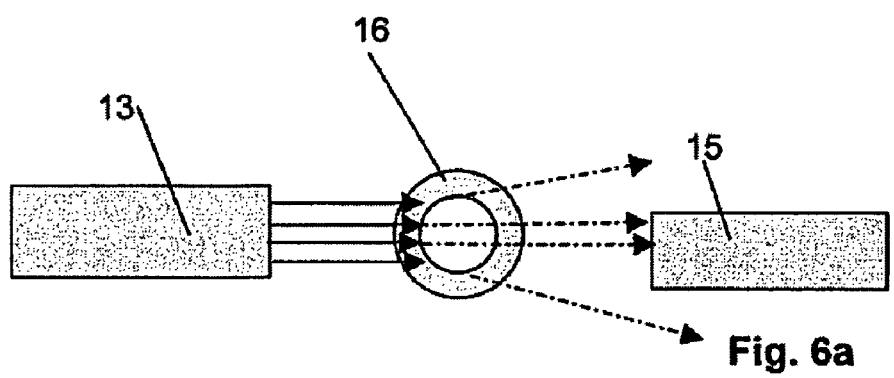
FIGS. 6a, 6b show a schematic diagram of an arrangement in which the transmitting waveguide is arranged to be diametrically opposite the receiving waveguide, shown both with and without medium in the line.
Figure 6B:
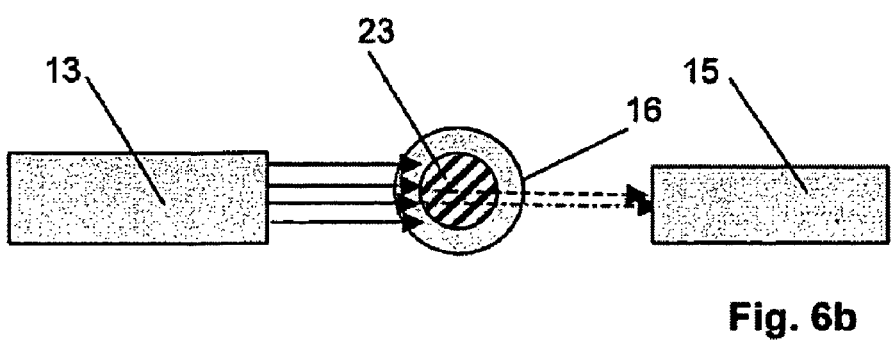
Figure 10:
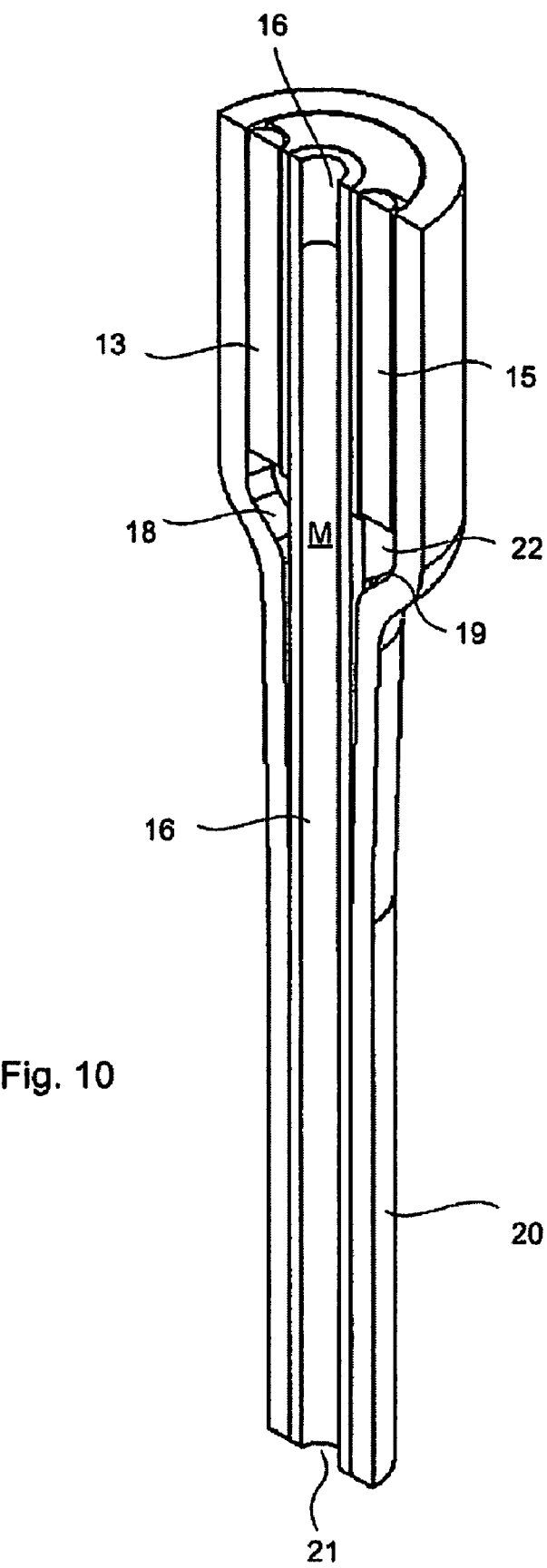
FIG. 10 shows a section at the height of the measurement point with the waveguides arranged at an angle of 180°.

FIGS. 6a, 6b show an arrangement in which a receiving waveguide 15 assigned to the receiving element 11 is arranged opposite a waveguide 13 assigned to the transmission element 10, so it is diametrically opposite at 180° in relation to the line 16. This allows a transmission measurement in which the presence of the liquid medium 23 yields a high signal value. The light is directed by the transmitting waveguide 13 onto the line. Most of the light is transmitted or absorbed. In the presence of a gas such as air in the line 16, according to FIG. 6a, some of the light is totally reflected. The remaining portion of the transmitted light is input into the receiving waveguide 15. In the case of a liquid medium 23 filling (water, which has approximately the same refractive index as the material of the tubing), the amount of light of the boundary zones is additionally input into the receiving waveguide 15. With suitable dimensions of the receiving waveguide 15 (diameter of the waveguide in relation to the inside diameter of the line) this yields a much larger quantity of light in the case of a liquid medium filling. The placement of the receiving waveguide 15 here depends on the inside diameter of the line 16. Again in this approach, the useful signal is clearly separated optically from the input signal by the second waveguide. However two waveguides are also required here. The oppositional placement of the waveguides is easily implementable. The signal (air/gas < > liquid) may, however, depend on the turbidity of the liquid medium because liquids with a high absorption may appear like air. FIG. 10 shows a corresponding sectional diagram.

Figure 7A:
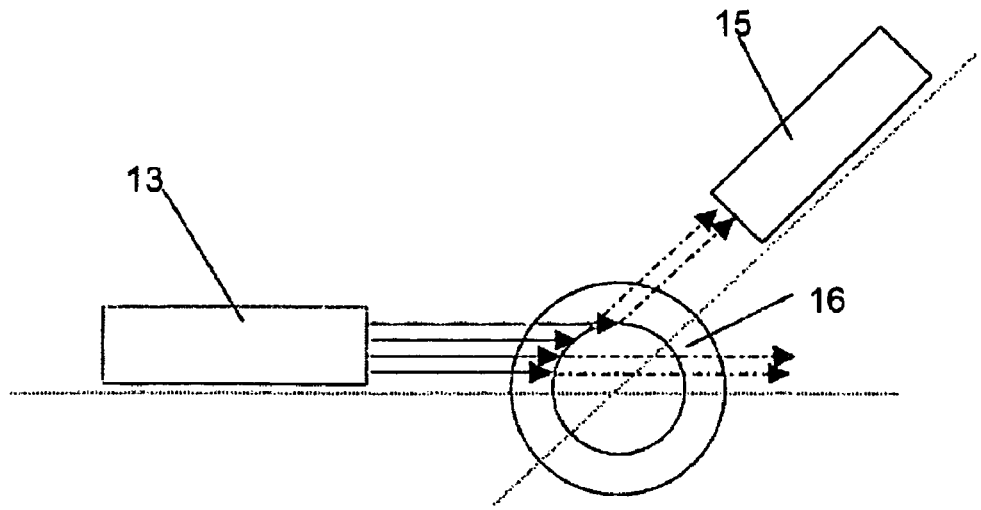
FIGS. 7a, 7b show a schematic diagram of an arrangement according to FIGS. 5a, 5b with the waveguides arranged decentrally.
Figure 7B:
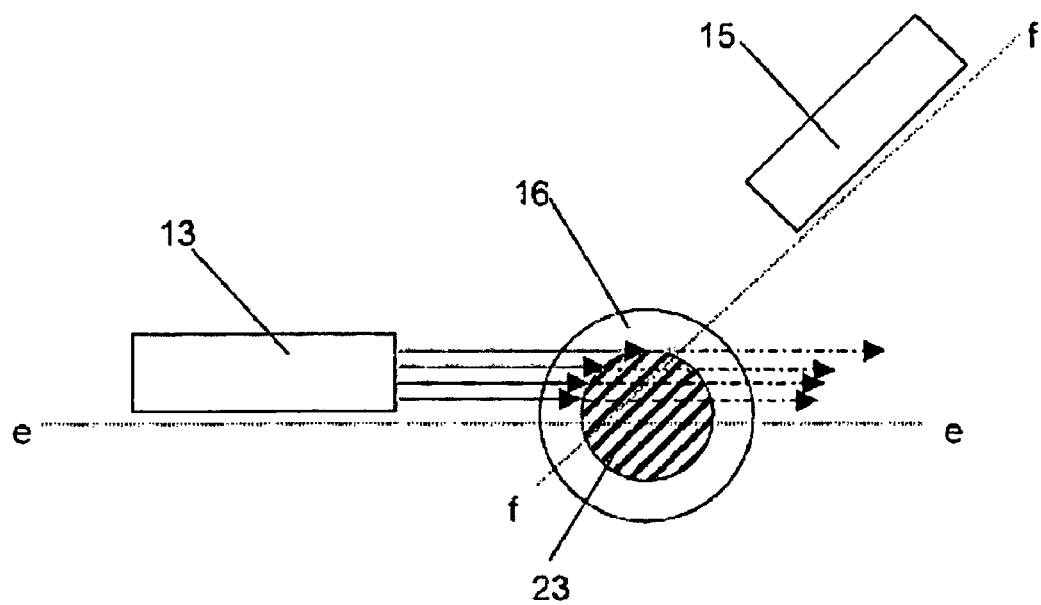

FIGS. 7a, 7b show an arrangement in which the waveguides are arranged like the angles in FIGS. 5a, 5b but in parallel to the planes e-e, f-f passing through the midline of the line 16, i.e., the transmitting waveguide 13 and the receiving waveguide 15 are laterally offset so that the emitted and/or received light goes to the line in parallel with this plane. Although this is shown in the exemplary embodiment at an acute angular arrangement of 120°-155° with a total reflection measurement at the air/gas boundary, it is self-evident that this decentralized and/or laterally offset arrangement may also be used with the other exemplary embodiments.

This approach offers very good prerequisites with regard to the usable signal deviation (air/gas <–> liquid) as well as with regard to the available signal strength, so that simple signal amplifiers are sufficient. Light is directed from the transmitting waveguide 13 onto the line 16. The axis of the waveguides here is offset laterally to the center of the line to illuminate the boundary zone of the inside of the line as much as possible. If the line is filled with air/gas, most of the light is totally reflected on the inside surface of the line due to the shallow impingement angle. Due to a suitable orientation of the receiving waveguide 15, which is also offset laterally, most of the totally reflected light can be sent to the receiving element 11 with the receiving waveguide 15. By utilizing the total reflection on the inside wall of the line 16 with air/gas, much larger quantities of light can be supplied to the receiving element 11 than is the case with measurements of scattered light or diffuse reflected light.

In the presence of liquid (water, cloudy liquids) the light is transmitted to the line/liquid interface and therefore is not reflected in the direction of the receiving waveguide 15. Only scattered light can be detected by the receiving waveguide 15. However, this is only a fraction of the light totally reflected with air/gas. Cloudy liquids can therefore be differentiated reliably from air.

Figure 12A:
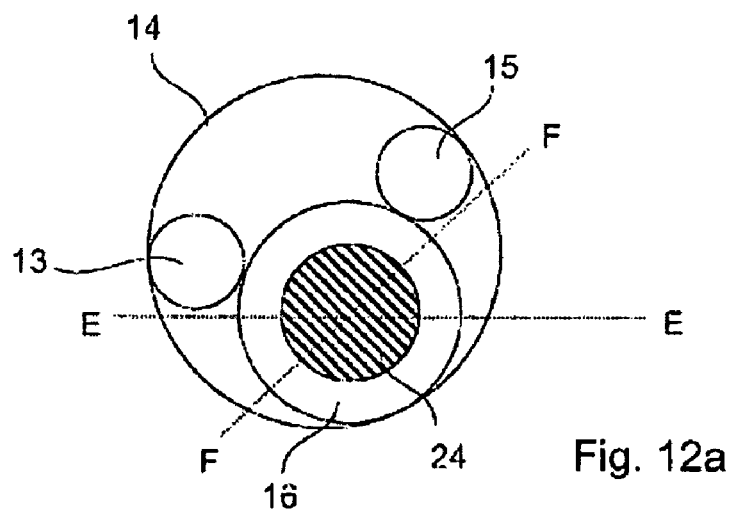
FIGS. 12a, 12b show a section through the hollow needle in an embodiment according to FIGS. 7a, 7b, FIGS. 13, 14 show three-dimensional views of a holder with optical deflecting elements.
Figure 12B:
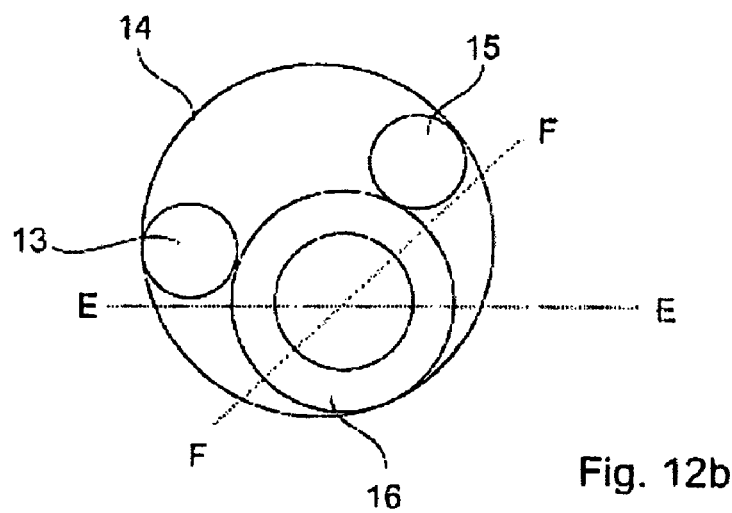
Figure 13:
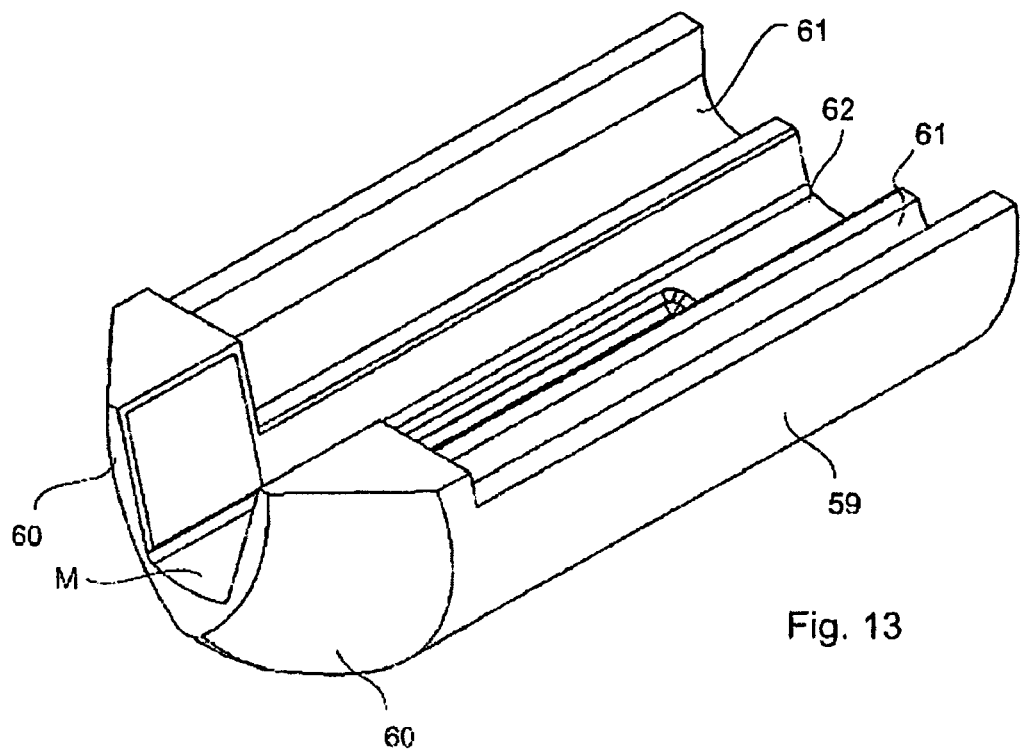
Figure 14:
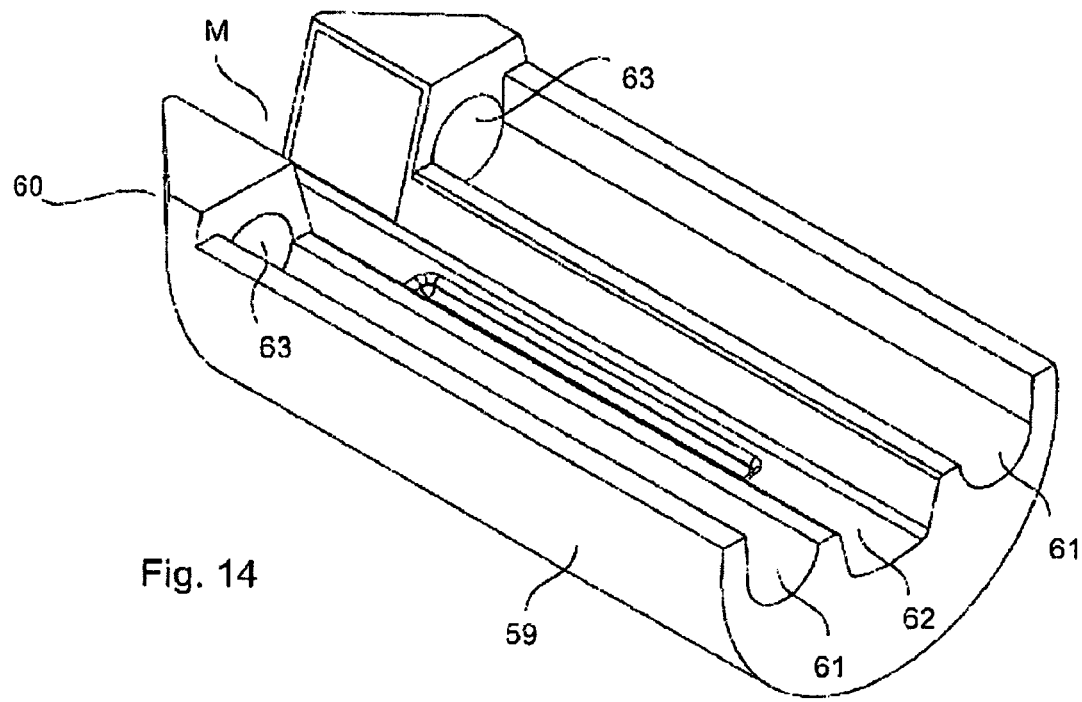

On the basis of the offset of the waveguides relative to the center of the line 16, the deflection of the light in the tip of the pipetting needle is not through the conical inside surface of the hollow needle 14 but instead through optical deflection elements 60 such as prisms, according to FIGS. 13 and 14. The dimensioning of the lateral offset and the angular position of the waveguides relative to one another depend on the inside diameter of the line 16. Changes in the inside diameter therefore require adapted optical deflection elements 60. Due to the lateral offset of the waveguides relative to the line 16, the installation space in the area of the measurement point M can be utilized more optimally than with concentric arrangements, as shown by a comparison of FIG. 11 with an arrangement according to one of the exemplary embodiments of FIGS. 2 through 6b with an arrangement according to FIGS. 12a, 12b corresponding to an embodiment according to FIGS. 7a, 7b. Due to the smaller installation space, it is possible to reduce the outside diameter and the outside surface area of the hollow needle 14 that are wetted by the pipetting medium or the washing liquids. The surface wetted with liquids offers the risk of droplet formation in the area of the tip, which in turn presents an increased risk of faulty pipetting due to dilution effects, entrainment, etc., so that this arrangement supports the effort to minimize the wettable surface area.

The signal (air/gas <> liquid) is independent of turbidity of the liquid medium because air always represents the higher signal. A high portion of the incident light can be used as the useful signal as a result of utilization of the total reflection at the air and/or gas interface. The useful signal is clearly separated optically by the second receiving waveguide 15. The smaller installation space of this arrangement, according to FIGS. 12a, 12b, in comparison with the arrangement according to FIG. 11, leads to a smaller outside diameter of the needle, and there is less wetting of the outside surface of the needle. However, two waveguides are needed. The waveguides must be positioned carefully due to the dependence on the tube geometry.

FIGS. 13 and 14 show an embodiment of a holder 59 on which optical deflecting elements 60 with spherical "mirror surfaces" in the exemplary embodiment are provided, resulting here in reflection as total reflection at the interface with air. The holder 59 has receptacles 61 to receive the two waveguides 13, 15 here, and a receptacle 62 for the line 16. Its outside diameter preferably determines the diameter of the hollow needle 14. The waveguides 13, 15 are positioned in the holders 63, which may be glued-in-place positions, for example. Preferably, the waveguides may also be embedded in plastic or other plastifiable compounds, for example, or integrally molded in or on, or sheathed thereby. The holder 59 may also be made of a plastic, e.g., PMMA.

Figure 15:
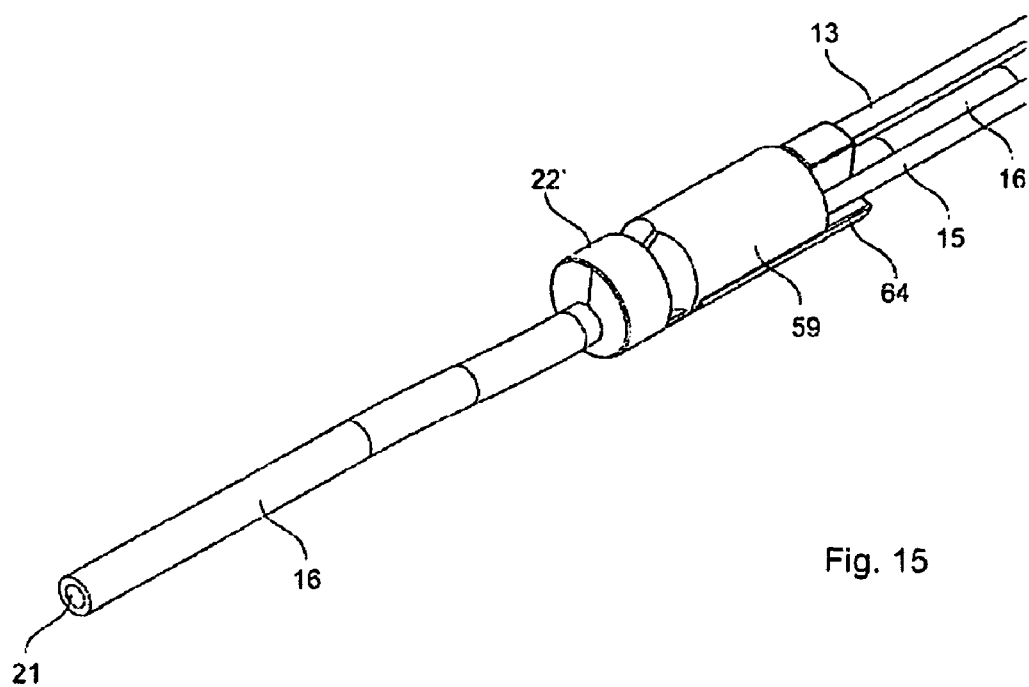
FIG. 15 shows a three-dimensional view of the holder with the aperture in the area of the optical element.
Figure 16:
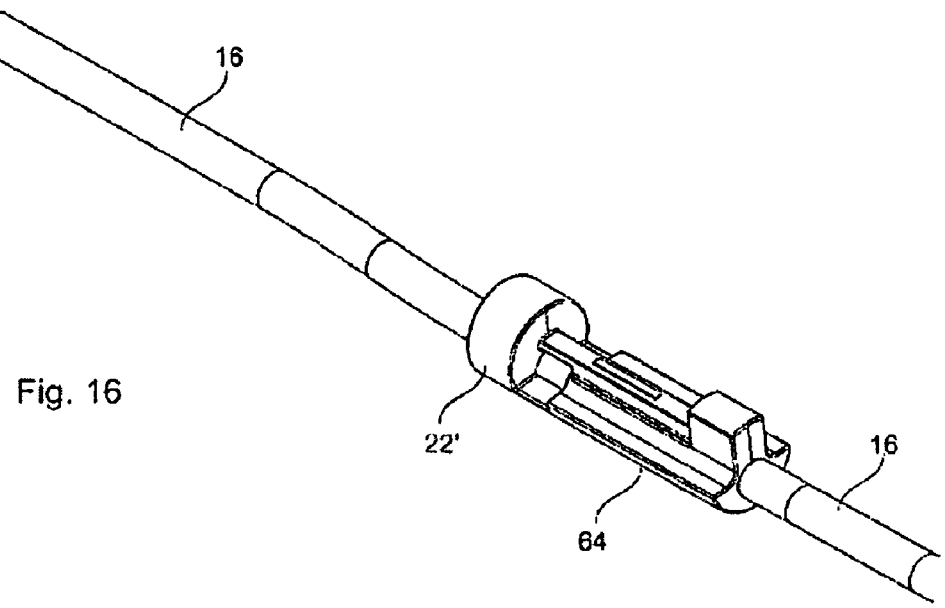
FIG. 16 shows a view according to FIG. 15 from another angle of view with the holder removed.
Figure 17:
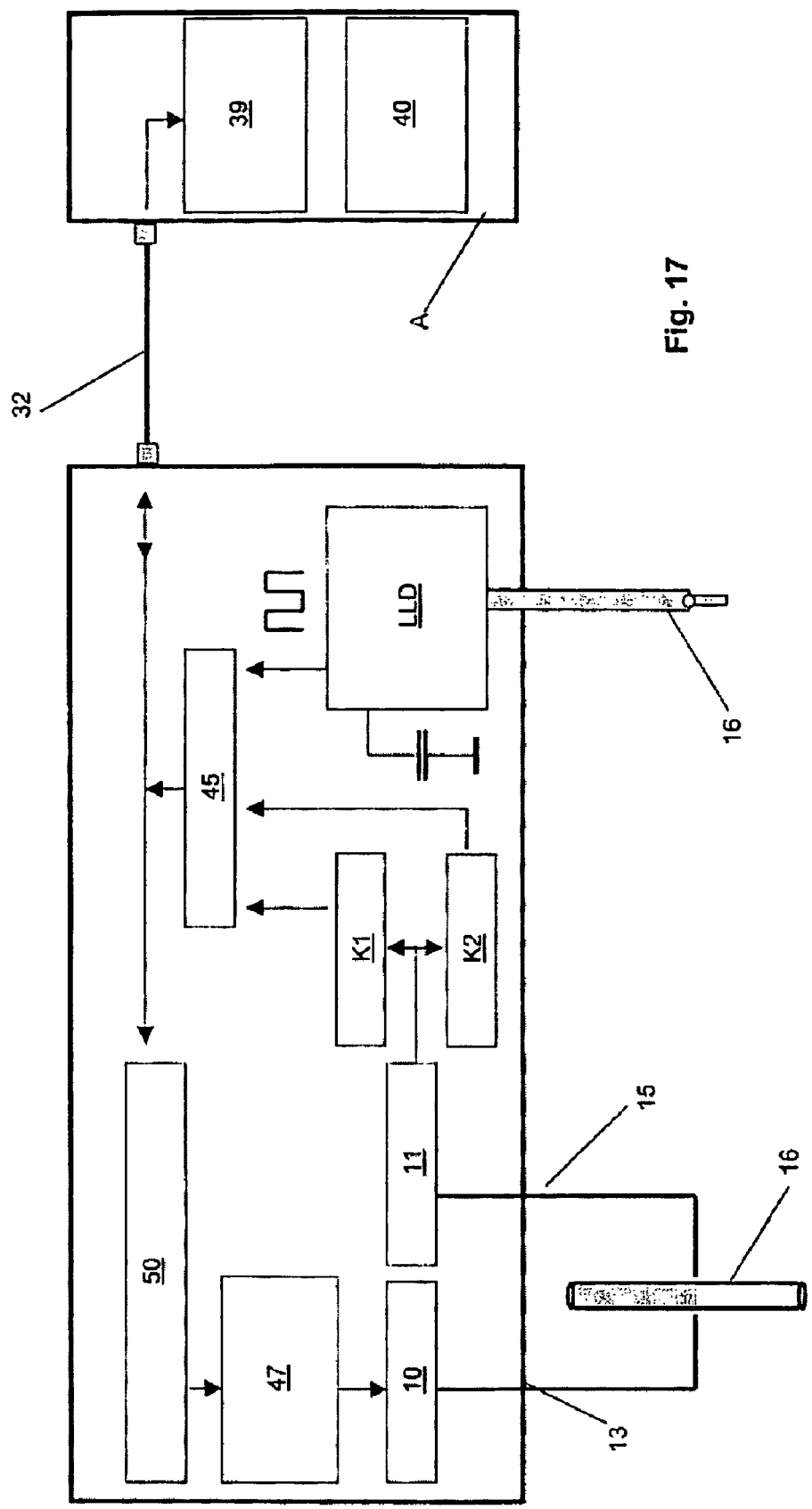
FIG. 17 shows a schematic diagram of the electronics.

The holder 59 with the optical element implements the 90° deflection of light by total reflection at the interface of the optical element with air. The holder, which is attached directly as an injection mold part to the line 16 according to FIG. 15, orients the optical element in relation to the tubing and implements optical apertures. The waveguides 13, 15 are glued directly to the holder 59. After finishing, all the components are integrated into the hollow needle 14, which thus need not have an optical function. FIG. 16 shows the holding element 64 as a black plastic part as an aperture 22', and the mount of the holder 59 as an optical element.

In these examples, it was mentioned that the waveguides must be arranged accordingly, e.g., at the focal point. Since the invention also works with deflecting surfaces, it is sufficient, however, if a corresponding deflecting surface is arranged accordingly.

Optical detection alone may also be performed instead of a capacitive liquid level detection. On the basis of the short path between the measurement point M and the intake opening 21, the device "sees" when liquid is drawn in and can use it for surface detection. It is thus possible to avoid using a conductive tip and/or a conductive system. Nonconductive liquids can also be detected reliably.

However, if the line 16 and/or preferably the hollow needle 14 is metallic and/or conductive, then capacitive liquid level detection LLD is also possible. To do this, the hollow needle 14 is metallically conducting and/or conductive and is insulated electrically (34 in FIG. 9) with respect to the instrument ground and is accommodated in a housing 30 of the device. Furthermore, the optical detection is connected to the circuit board of the electronic system 33 via a contact spring 35. In addition to the optical sensor for phase transition detection, a capacitive sensor concept ensures detection of the liquid level. The two sensors together represent a redundant sensor system, which can be verified mutually in the function during operation. The function of the capacitive liquid level detection LLD can be verified during operation with the additional optical sensor. Conversely, with the liquid level detection function, it is also possible to check the functionality of the optical sensor indirectly. This creates a system capable of checking itself functionally on the basis of the two available methods, which are completely different physically.

The method essentially serves to achieve optical detection of at least one phase transition between at least two media, which are drawn into a line 16 and/or dispensed from the line 16 by an intake and/or dispensing device. The at least one medium is drawn into the line 16 and/or dispensed from the line. To detect the phase boundary between the media, light is emitted across and onto the line 16 at a measurement point M intended for this purpose. The light, which is influenced by the media in the line 16 and is emitted by the transmitting element 10, is then detected by a receiving element 11, forming reception signals, which are analyzed by the analyzer unit A to detect the phase transition. By arranging at least one waveguide 13, 15 between the transmitting element 10 and/or the receiving element 11 and the measurement point M, the measurement point is definitely shifted in the direction of the tip of the probe 20 and/or the pipette.

A typical sequence of a pipetting operation like an individual pipetting may proceed as follows with this device:

a) Cleaning/Rinsing The Pipetting System

The pipetting system is rinsed with system liquid (twice distilled water) to remove residues of liquids/media pipetted previously. This ensures that the system is filled with liquid up to the tip of the pipetting needle.

The following errors can be detected in this step:

The sensor detects air because no system liquid is present in the system; the system detects air bubbles at the end of the rinsing operation, i.e., the system may be leaky.

b) Intake of the Separation Air Gap

To pipette liquids without any great dilution effects, a separation air gap (air) is taken up in a controlled manner. This air gap separates the system liquid from the liquid to be pipetted. By the intake of a defined quantity of air greater than the dead volume T between the pipetting tip and the measurement point M, air is introduced into the sensor area in a defined manner.

The following errors can be detected in this step:
No transition from liquid to air is detected because
the pump is defective or the function is disturbed and/or is not being executed,
the system is leaking,
the intake opening 21 is clogged.

c) Intake of the Liquid to be Pipetted

After uptake of the separation air gap, the tip of the pipetting needle is immersed by the pipetting mechanics into the liquid to be pipetted by means of capacitive liquid level detection. Then an excess of the liquid to be pipetted is drawn into the line 16 by the pump 12 in a controlled manner, the excess being necessary for a backlash function of the pump. During this time, there is continuous monitoring for transitions from liquid to air. Only the first transition from air to liquid, namely the separation air gap, is allowed within an expected window as defined by the pump 12. Any other transitions are regarded as defects.

The following errors can be detected in this step:
No transition from air to liquid within the expected window because
the pump is defective or the function is disturbed and/or is not being executed,
the system is leaking,
the tip of the pipette is not immersed in the liquid, e.g., because of a defect in the capacitive liquid level detection.
Transition from liquid to air after transition from air to liquid in the expected window because
there is an intake of foamy liquid,
the tip of the pipette emerges from the liquid during the intake,
no more liquid is present to be taken up.

d) Releasing the Liquid Excess (Backlash Function)

With the pipetting tip still immersed, a small amount of the liquid taken up is released. The volume to be dispensed here is greater than the dead volume T between the pipetting tip and the measurement point M. This ensures that the volume actually to be pipetted has been analyzed completely for errors. Within this process, the sensor sees liquid continuously. Therefore no additional relevant errors can be detected.

e) Intake of the Transport Air Gap

To ensure reliable transport of liquids, an additional transport air gap of air is drawn in. The air intake volume is greater than the dead volume T between the pipetting tip and/or the intake opening 21 and the measurement point M. In this process, the sensor must thus detect a transition from liquid to air if the transport air gap has been received successfully.

In this step the following errors can be detected:
No transition from liquid to air is detected because
the pump is defective or the function is disturbed and/or is not being performed,
the system is leaking,
the intake opening 21 is clogged,
the pipetting needle is still immersed in the liquid when taking in the transport air gap.

f) Dispensing the Liquid

After transfer of the pipetting needle to the site of dispensing of the liquid, the pump 12 dispenses the liquid that has been taken up. In doing so the sensor must first detect a transition from air to liquid, followed by a transition from liquid to air and then a transition from air to liquid (system liquid). If this is the case, the total amount of liquid to be pipetted has been successfully dispensed.

In this step the following errors can be detected:
the pump is defective or the function is disturbed and/or is not being performed,
the system is leaking,
the intake opening 21 is clogged.

This describes the sequence for a single pipetting. In the sequence of a multi-aspirate pipetting procedure, several liquids can be and are taken up in succession, each separated by a separating air gap. This does not change anything about the basic performance of the sensor and the signal states. Only points b) through e) are used repeatedly, and the number of transitions in dispensing (see point f) increases accordingly.

According to this process, no volume determinations are performed with the sensor. However, transition signals in corresponding expected windows are evaluated with the sensor.

The measurement device uses waveguides and preferably uses the inside surfaces of the steel needle and/or the pipette as an optical deflecting mirror or another suitable deflecting lens. This results in new possibilities for optimized placement of the measurement point of the sensor at a distance of <15 mm from the pipetting tip. The dead volume between the pipetting tip and the measurement point may therefore be reduced to just a few µl. The advantages thus include the fact that
the liquid volume to be pipetted must pass through only a very small additional distance, and therefore
the formation of droplets or separation of the air gap is unlikely,
dilution effects with the system liquid are minimized,
contamination of the pipetting needle is reduced and therefore the washing time is shortened,
calibration of the dead volume is not necessary and therefore the entire procedure is greatly simplified and made more reliable.

Owing to the very small dead volume due to the fiber optic sensor in the pipetting tip, the determination of a "calibration track" may be omitted. Likewise, because of the known geometric variables, the dead volume can be calculated directly. Possible errors due to geometric tolerances are negligible (<1 µl).

In addition to the desired volume, according to this invention an additional volume may also be taken up. This additional volume bridges the small dead volume of the system to ensure that the actual pipetting volume is taken up without error. Then the additional volume is dispensed again, and only then is the transport air gap taken up. This method cannot be used in the state of the art because the large dead volume there would lead to a wasting of the reagent or liquid.

Because of the small dead volume according to the invention, a complex reverse calculation may be omitted. This eliminates most of the calibration and computation steps. Some situations may even be verified by the static signal of the sensor (after stoppage of the pump).

Figure 8:
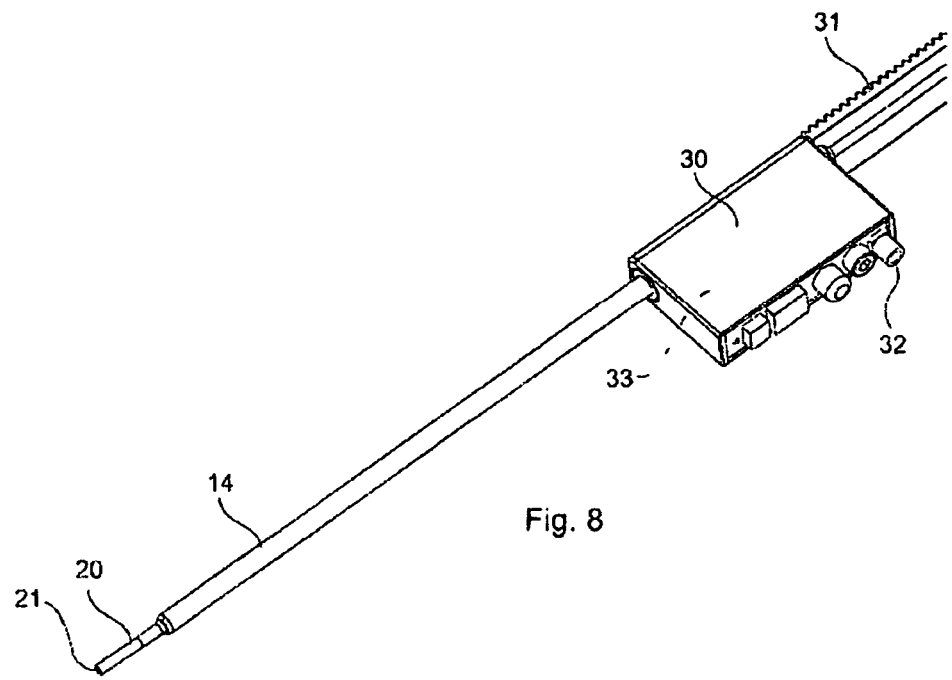
FIGS. 8, 9 show a three-dimensional overall view of the intake and dispensing device and a section through it.
Figure 9:
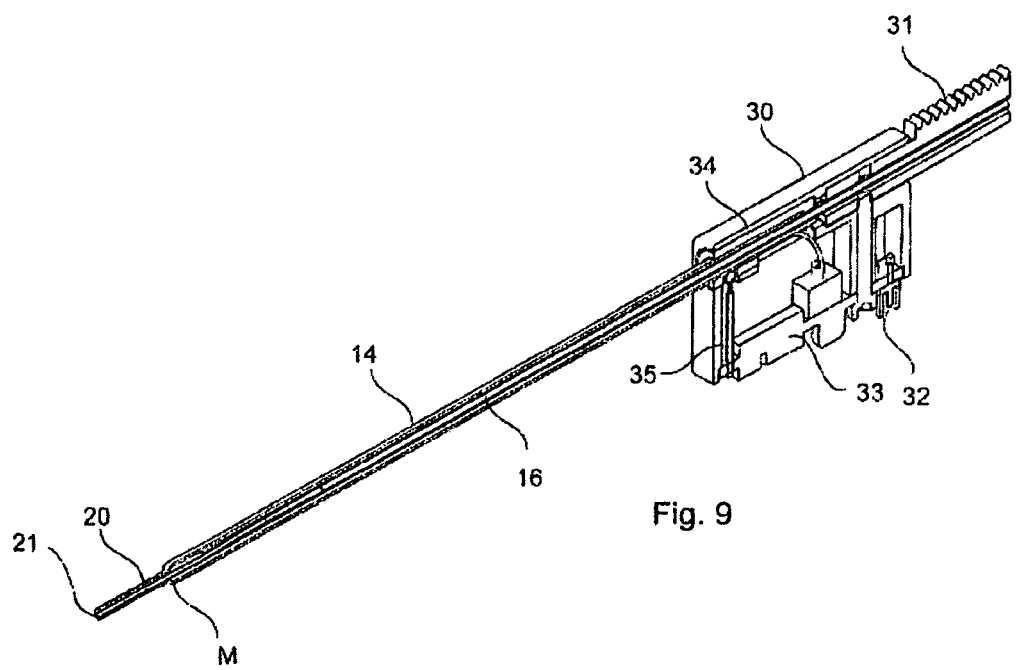

FIGS. 8 and 9 show an overall view of the device and a cross section through the device with the hollow needle 14, probe 20 with the intake opening 21, and the respective housing 30 with the integrated electronics 33. The electronics comprise means for generating light, the receiving element and analyzer means, e.g., for a capacitive liquid level detection. The electronics 33 are integrated into the sensor head and utilize only a coaxial cable 32 or some other suitable multiline connection such as a film cable for multiple signal transmission to the higher-level electronic controls. The device can be moved, preferably vertically, via a toothed rack 31.

The design of the LLD system consists of an RC oscillator with a basic frequency of approx. 1 MHz, for example. Furthermore, the hollow needle 14 is accommodated in electric insulation in the housing 30. The parasitic capacitance generated by a needle with its environment is parallel to the capacitor of the oscillator. A change in this capacitance produces a change in the frequency of the oscillator. The higher the capacitance, the lower is the output frequency of the oscillator. When the needle comes in contact with a medium there is an increase in capacitance due to the change in the dielectric. This increase in capacitance leads to a frequency jump at the output of the oscillator. The downstream electronics (LLD in FIG. 11) detect this jump. The oscillator signal is modulated at the operating voltage for the transmission to the analyzer unit A so that the signal can be carried over the coaxial cable 32.

Figure 11:
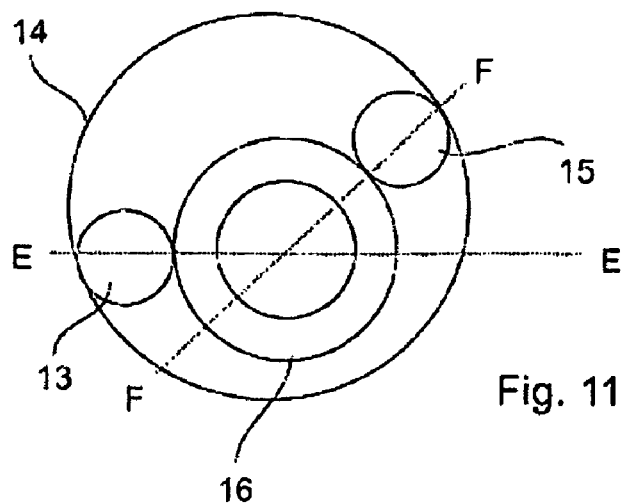
FIG. 11 shows a section through the hollow needle.

To analyze the analog signal of the detector for the interface according to FIG. 11, the emitter voltage of the receiving element 11 and/or a photodetector is sent to a two-stage comparator unit. The first comparator stage K1 signals the actual operating point of the photodetector, which is set with the help of a regulable power supply 50 via the working point setting 47. A change in the power supply causes a change in the intensity of the LED. To this end, the liquid system comprising the line 16 in the optical beam path is preferably filled with air and/or gas. The second comparator stage K2 detects a change in the optical beam path such as that produced by a clear or cloudy liquid. The detected quantity of light is reduced, so that the output voltage of the photodetector is reduced. If this output voltage falls below the threshold of the comparator stage K2, this is a reliable sign that there is liquid in the line 16 at the measurement point. By modulation of the power supply by means of a mixer 45, the signal is transmitted to the higher-level analyzer unit A, where it is processed by the processor 40 via the comparator and analyzer unit 39.

It is self-evident that this description may be subject to a wide variety of modifications, changes and adjustments that vary within the range of equivalents to the appended claims.

The invention claimed is:

1. Device for optical detection of at least one of a phase transition between at least two media and a static state of media, which media are at least one of drawn into a line and dispensed from the line by an intake and/or dispensing device, comprising a pump for intake and dispensing of at least one of the media into and out of the line, a probe arranged at the end of the line, at least one light-emitting transmission element for emitting light across and onto the line at a measurement point intended for this purpose, at least one receiving element for receiving the light that has been influenced by the media in the line and is emitted by the transmitting element to form reception signals, an analyzer unit for analyzing the reception signals for detection of the phase transition or the static state, at least one waveguide provided between the measurement point and at least one of the transmitting element and the receiving element, said waveguide being continued up to the measurement point, wherein the waveguide is arranged in parallel with and separated from the line, and wherein at least one deflecting lens for deflecting at least one of the light emitted and the light to be detected is provided in the area of the measurement point, while the media is moved by the pump in the line in parallel to the waveguide.

2. Device according to claim 1, wherein the measurement point is arranged so close to an intake opening of the probe that the volume drawn in is a multiple of the dead volume in the line between the intake opening and the measurement point.

3. Device according to claim 1, wherein at least two waveguides are arranged up to the measurement point (M) for emitting and/or receiving light.

4. Device according to claim 1, wherein the line is formed by a material permeable for the wavelength of the light used, at least in the area of the measurement point.

5. Device according to claim 1, wherein the line is a tubular line.

6. Device according to claim 1, wherein the line is accommodated by a hollow needle, at the end of which the measurement point is provided.

7. Device according to claim 6, wherein the hollow needle has at least one of the properties of being conductive or metallic.

8. Device according to claim 6, wherein the height of the measurement point in the longitudinal direction of the line is determined essentially by the height of a conical area of the hollow needle.

9. Device according to claim 6, wherein at least one of the elements comprising the line and the hollow needle is suitable for capacitive liquid level detection.

10. Device according to claim 9, wherein the hollow needle is conductive and is accommodated in a housing of the device in such a way that it is electrically insulated.

11. Device according to claim 1, wherein an optical aperture is provided in the area of the end of the at least one waveguide in the area of the measurement point.

12. Device according to claim 1, wherein at least one deflecting surface is used as the deflecting lens.

13. Device according to claim 12, wherein the at least one deflecting surface is formed by conically shaped inside surfaces of the hollow needle, which is preferably designed as a steel tube.

14. Device according to claim 1, wherein the emitted light is also received by a transmitting waveguide.

15. Device according to claim 1, wherein a waveguide assigned to the receiving element is arranged diametrically opposite a waveguide assigned to the transmitting element in relation to the line.

16. Device according to claim 1, wherein a waveguide assigned to the transmitting element is arranged at an angle to a waveguide assigned to the receiving element in a sectional view through the line.

17. Device according to claim 16, wherein the angle is an acute angle.

18. Device according to claim 16, wherein the angle is an obtuse angle, preferably between 120° and 175°.

19. Device according to claim 1, wherein the at least one waveguide is arranged in parallel with a plane passing through the center line of the line such that at least one of the emitted and/or received light travels to the line in parallel with this plane.

20. Device according to claim 19, wherein a waveguide assigned to the transmitting element and a waveguide assigned to the receiving element are arranged such they are offset laterally in relation to the planes.

21. Device according to claim 1, wherein the line is suitable for capacitive liquid level detection.

22. Method for the optical detection of at least one of a phase transition between at least two media and a static state of media, which media are taken into a line and dispensed from the line by an intake and dispensing device, comprising:
emitting light by a transmitting element across and onto the line at a measurement point provided for this purpose during the intake and dispensing or in a static state of the medium in the line, and
converting transmitted light which has been influenced by the media in the line by a receiving element, with the formation of receiving signals, via at least one waveguide arranged between the measurement point and at least one of the transmitting element and the receiving element, to electric signals, which are analyzed to detect the phase transition or the static state,
wherein the waveguide is arranged parallel to and separate from the line, and the light emitted and the light to be detected is deflected by at least one deflection lens in the area of the measurement point, while the media is moved by the pump in the line in parallel to the waveguide.

23. Method according to claim 22, wherein the measurement point is arranged on a probe situated at the end of the line so close to an intake opening of the probe that the intake volume is a multiple of the dead volume in the line between the intake opening and the measurement point.

24. Method according to claim 22, wherein at least two waveguides for emitting and receiving the light are arranged up to the measurement point.

25. Method according to claim 22, wherein an optical aperture is attached in the end area of the at least one waveguide at the measurement point.

26. Method according to claim 22, wherein the emitted light is also received by a transmitting waveguide.

27. Method according to claim 22, wherein with respect to the line, a waveguide assigned to the receiving element is arranged diametrically opposite a waveguide assigned to the transmitting element, such that the receiving element receives the light transmitted through the line.

28. Method according to claim 22, wherein a waveguide assigned to the receiving element is arranged at an angle relative to a waveguide assigned to the transmitting element, such that the receiving element receives the light passing through the medium in the line.

29. Method according to claim 22, wherein the at least one waveguide is arranged in parallel with a plane passing through the center line of the line, such that the light emitted and received goes to the line in parallel to this plane.

30. Method according to claim 22, wherein, by means of at least one of the elements comprising the line or a hollow needle, a capacitive liquid level detection is performed.

31. Method according to claim 22, wherein the phase transition and the static state is detected continuously during the intake and dispensing operation.

* * * * *